April 14, 1970  KARL-HEINZ HOLDERBAUM  3,506,338
CAMMING CYLINDER FOR OPTICAL COMPONENTS AND
METHOD OF MAKING SAME
Filed March 27, 1967
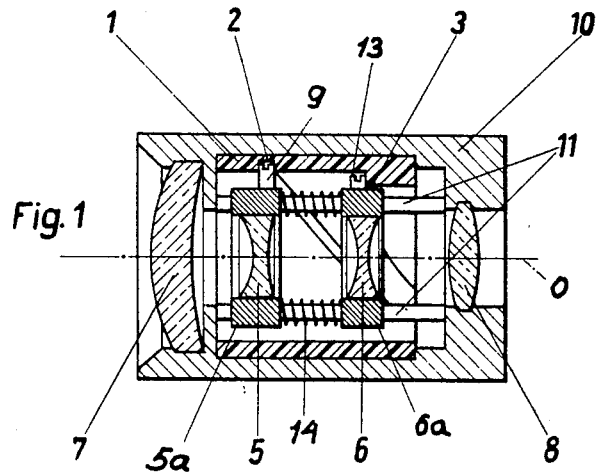
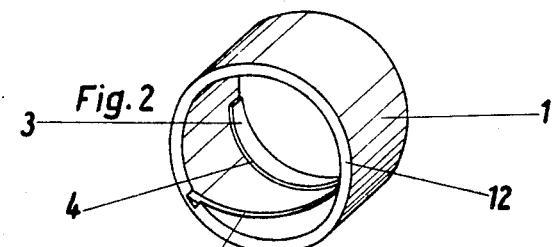
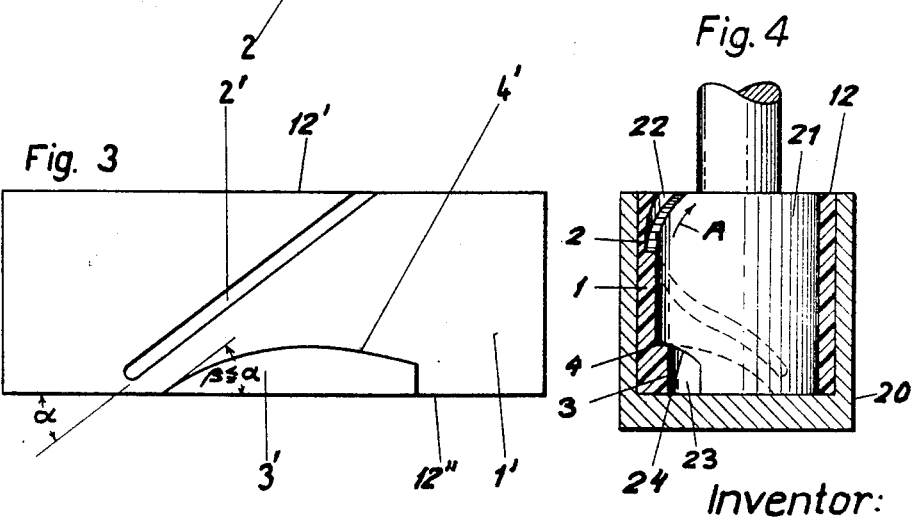
Inventor:
Karl-Heinz Holderbaum
By Karl G. Ross
Attorney

United States Patent Office 3,506,338
Patented Apr. 14, 1970

3,506,338
CAMMING CYLINDER FOR OPTICAL COMPONENTS AND METHOD OF MAKING SAME
Karl-Heinz Holderbaum, Bad Kreuznach, Germany, assignor to Jos. Schneider & Co. Optische Werke, Bad Kreuznach, Germany, a corporation of Germany
Filed Mar. 27, 1967, Ser. No. 632,137
Claims priority, application Germany, Apr. 19, 1966,
Sch 38,843
Int. Cl. G02b 15/00, 7/04, 7/06
U.S. Cl. 350—187                    2 Claims

ABSTRACT OF THE DISCLOSURE

Camming cylinder rotatable about axis of objective system with two components axially displaceable at different rates, the cylinder having a helical guide curve on its inner periphery for the displacement of the first component and a curvilinear terminal shoulder for the concurrent displacement of the second component; the cylinder is cast in one piece in a mold with a core having a helical ridge and a terminal peripheral recess for the formation of the guide curve and the shoulder, respectively, the core being separable from the cast cylinder by unthreading along the helical ridge in a direction away from the terminal shoulder of the cylinder.

My present invention relates to a camming cylinder for the axial displacement of components of an optical objective in a photographic or cinematographic camera.

In such objectives, particularly those of the varifocal type as disclosed for example in commonly owned U.S. Patent No. 3,165,044 to Paul Himmelsbach, means must be provided for axially displacing at least one and usually two components according to a predetermined law. With two-component displacement, separate camming formations are required for individually moving the components at different rates, e.g. for the purpose of varying the focal length of the objective while holding its image plane stationary. For positive guidance and compactness of structure, it is advantageous to make the camming formations part of a tubular member centered on and rotatable about the objective axis, these functions being generally represented by peripheral slots engaged by pins projecting from the respective components.

The machining of cylindrical members to provide peripheral camming slots therein is difficult and time-consuming in view of the great accuracy with which these slots must be milled to insure satisfactory optical performance. The milling process also results in the occurrence of transverse notches which interfere with the smooth sliding of the guide pins or other projections in the camming slots.

The general object of my invention, therefore, is to provide an improved camming cylinder for the purpose described and a more rational process for mass-producing such cylinders with avoidance of the aforestated disadvantages.

I have found, in accordance with this invention, that such a cylinder can be cast from suitable molding material (e.g. metal or synthetic resin) with a formation in the shape of a helical peripheral groove, terminating at one of the end faces of the cylinder, with the aid of a mold core having a corresponding helical peripheral ridge which, after the molded article has hardened, can be withdrawn from that article by an unthreading motion along that ridge, leaving intact the grooved article which is thus ready for use as a means for axially displacing an optical component, e.g. for focusing or focal-length adjustment. Preferably, in order to strengthen the cylindrical body and to maintain its continuity even when the molded helical groove extends over all or the greater part of its length, this groove has a depth less than the wall thickness of the cylinder so as not to constitute a throughgoing slot. The molded cylinder, therefore, will have a continuous outer peripheral surface.

A more particular object of my invention is to adapt the aforedescribed technique to the manufacture of a cylinder with two camming formations of different curvatures for the independent guidance of a pair of axially movable components. The latter object is realized, in conformity with another important aspect of my invention, by providing the mold core with a curvilinear peripheral recess which defines a complementary peripheral shoulder on the inner surface of the molded cylinder for the camming displacement of a second component. The core can be freely unthreaded from the molded article in a direction away from the shoulder so formed thereon, provided that a line tangent to the shoulder at any point thereof includes with a transverse plane an angle not exceeding the pitch angle of the helical groove. Though the arcs spanned by the groove and the shoulder should be substantially equal, these two formations need not be in peripheral alignment since the guiding projections on the corresponding component can lie in different axial planes of the cylinder.

The invention will be described in greater detail with reference to the accompanying drawing in which:

FIG. 1 is a somewhat diagrammatic view, in axial section, of a varifocal optical objective with two axially displaceable components controlled by a camming cylinder according to the invention;

FIG. 2 is an isometric end view of the camming cylinder of FIG. 1;

FIG. 3 is a developed view of the inner peripheral surface of the camming cylinder; and FIG. 4 is a view, partly in section, of a mold used in the manufacture of the camming cylinder of FIGS. 1–3.

The objective shown in FIG. 1 comprises a tubular housing 10 accommodating a camming cylinder 1 for rotation about the axis O thereof. Two positive components 7 and 8 are fixedly positioned in housing 10, two negative components 5 and 6 being bracketed by these positive components and being axially movable along a peripheral array of guide rods 11 (only two shown) passing through peripheral openings in the mounts 5a, 6a of these movable members. Cylinder 1 has a helical peripheral groove 2, engaged by a guide pin 9 which projects outwardly from lens mount 5a, and a peripheral ledge 3 defining a curvilinear shoulder 4 (FIG. 2) which is engaged by a pin 13 projecting from lens mount 6a. Springs 14 on rods 11 maintain the projection 13 in contact with shoulder 4. As seen in FIG. 2, the helical groove 2 terminates at an end face 12 of cylinder 1 remote from ledge 3.

In the developed view of FIG. 3, the inner peripheral surface of cylinder 1 appears as a rectangle 1' with two major sides 12' and 12", side 12' corresponding to the annular end face 12 of FIG. 2. Groove 2' follows a straight line, terminating at side 12', and includes with the sides 12', 12" an angle α representing the pitch angle of the helix. Shoulder 4' of developed ledge 3' extends generally parallel to the sides 12', 12", except for an initial portion diverging from side 12" at an angle β which should not be greater than angle α and is here shown to be slightly less than the latter. It will further be apparent from FIG. 3 that each of the formations 2', 4' extends over approximately half the length of the rectangle 1', thus spanning an arc of substantially 180° of cylinder 1, the two arcs being slightly offset from each other.

Reference will now be made to FIG. 4 which illustrates a process of manufacturing the cylinder 1 from a mold consisting of an outer shell 20 and an inner core 21. The core has a helical ridge 22, complementary to the groove 2 to be formed in cylinder 1, and a peripheral recess 23 giving rise to the ledge 3 with its curvilinear shoulder 4 corresponding to the boundary 24 of that recess. It will be apparent from FIG. 4 that, upon completion of the molding process, the core 21 can be separated from cylinder 1 by an unthreading motion in the direction of arrow A, i.e. along the ridge 22 away from shoulder 4; owing to the aforedescribed relationship of the angles $\alpha$ and $\beta$, this unscrewing will not be impeded by the contours 4 and 24.

FIG. 4 also shows that the height of ridge 22, and therefore the depth of groove 2, is less than the wall thickness of cylinder 1 as defined by the annular clearance between mold elements 20 and 21, thus preserving the continuity and structural rigidity of the cylinder.

In plotting the curvature of shoulder 4 it will, of course, be necessary to treat the axial displacement of lens 5 as an independent variable and to determine the displacement of lens 6 as a function of that variable, a condition easily fulfilled in any zoom-type objective.

I claim:

1. A camming cylinder for the axial displacement of two components of an optical objective at mutually different rates, comprising an integrally molded cylindrical tubular body with a terminal inner peripheral shoulder and a helical inner peripheral groove made by casting said body in a mold formed by a cylindrical shell and a cylindrical core defining with said shell an annular space closed at one end, said core having a terminal peripheral recess with a curvilinear boundary at said one end, said shoulder being the counterpart of said recess, said core further having a helical peripheral ridge spaced from said recess and from the inner wall of said shell, said ridge being the counterpart of said groove and terminating at the opposite end of said annular space, the maximum slope of said curvilinear boundary being at most equal to that of said helical groove to facilitate unthreading of the cast body from said core along said helical ridge.

2. A process for making a camming cylinder with an inner wall surface having a helical groove and a differently curved ridge for the axial displacement of two components of an optical objective at mutually different rates, comprising the steps of casting a cylindrical tubular body in a mold formed by a cylindrical shell and a cylindrical core of smaller diameter defining with said shell an annular space closed at one end, said core having a terminal peripheral recess with a curvilinear boundary at said one end and further having a helical peripheral ridge spaced from said recess and from the inner wall of said shell, said ridge terminating at the opposite end of said annular space, and detaching the cast body from said core by a relative unthreading along said helical ridge, the maximum slope of said curvilinear boundary being at most equal to that of said helical ridge for facilitating such unthreading.

References Cited

UNITED STATES PATENTS

| | | |
|---|---|---|
| 2,799,049 | 7/1957 | Wilson. |
| 3,150,222 | 9/1964 | Blaustein et al. |
| 2,179,850 | 11/1939 | Clancy _____ 350—187 |
| 2,494,025 | 1/1950 | Altman _____ 350—184 |
| 3,027,805 | 3/1962 | Yamaji _____ 350—184 |
| 3,058,391 | 10/1962 | Leupold _____ 350—44 X |
| 3,330,615 | 7/1967 | Price _____ 350—187 |

FOREIGN PATENTS 714,415  11/1941  Germany.

PAUL R. GILLIAM, Primary Examiner

U.S. Cl. X.R.

350—44, 77